Dec. 9, 1958 R. B. DOME 2,863,997
AUTOMATIC GAIN CONTROL AMPLIFIER
Filed March 21, 1957

INVENTOR:
ROBERT B. DOME,
BY Donald N. Timbie
HIS ATTORNEY.

United States Patent Office 2,863,997

Patented Dec. 9, 1958

2,863,997

AUTOMATIC GAIN CONTROL AMPLIFIER

Robert B. Dome, Geddes Township, Onondaga County, N. Y., assignor to General Electric Company, a corporation of New York Application March 21, 1957, Serial No. 647,624

1 Claim. (Cl. 250—20)

Figure 1:
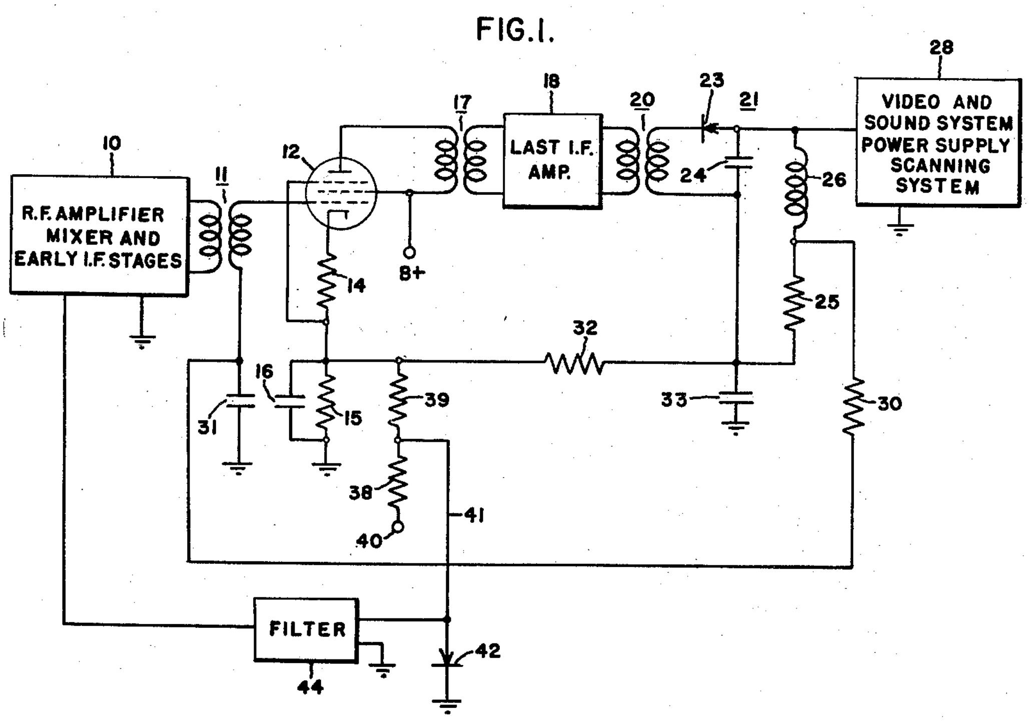

The present invention relates to a circuit in a receiver for amplifying the D. C. component of a voltage indicative of carrier amplitude and to thereby provide an enhanced automatic gain control (A. G. C.).

In both radio and television receivers it is desirable to have the same output from the receiver regardless of the strength of the signal to which the receiver is tuned. For example, when a person is changing stations on a radio the ordinary person wants to get the same degree of loudness from the radio regardless of the strength of the station signal that he tunes to. And likewise, in the case of television sets a person wants the same contrast in his picture regardless of the strength of the signal present on the particular channel to which he is tuned. Automatic gain controls in both radio and television sets provide control of the volume and contrast, respectively, to provide substantially constant output. If it were not for automatic gain control systems, a person when changing stations would have to adjust the volume control on his radio for every station he tunes to because the signal strengths of stations are different as a function of differences in radiated power and distance. Likewise, were it not for automatic gain controls in television receivers, the contrast control would have to be adjusted as stations were switched.

Another way of stating the automatic gain control problem is to say that there are variations in the amplitude of the carrier signal upon which the audio and/or video intelligence is impressed, which variations are due to effects such as distance, antenna orientation, etc. If these variations in carrier amplitude are not compensated for, there results the above-mentioned differences in the audio volume and video contrast. These variations in carrier amplitude are compensated for usually by varying the gain of the intermediate-frequency (I. F.) stages in response to the detected strength of the carrier signals. For very weak signals the gain is at a maximum, while for strong signals the gain is decreased. In a perfectly compensated system, the overall gain of the I. F. stages times the amplitude of the carrier is the same for all signals.

The gain of the I. F. stages is usually controlled by means of a varying direct-current (D. C.) bias voltage that is obtained from the second detector. The second detector produces an output signal having a D. C. component the average value of which is equal to the average value of the input to the detector. This input is the amplified carrier. Assuming that the effect of the intelligence on the average amplitude of the carrier is negligible, then the D. C. component from the second detector is indicative of the carrier amplitude.

This D. C. component is usually a negative-going signal. That is, for increases in average carrier amplitude it provides an increasingly negative signal and vice versa. Due to this negative-going feature, the voltage corresponding to this D. C. component can be conducted back to the grid circuits of the I. F. stages because this voltage is of the correct nature to produce gain control action.

Then, as the carrier amplitude increases, this voltage causes the grids of the I. F. stages to become more negative and thereby causes the gain of these stages to decrease. Conversely, when there is a decrease in the carrier amplitude, these grids are made less negative thereby causing the gain of the I. F. stages to increase. Thus, this A. G. C. signal, i. e. the voltage from the second detector, tends to maintain the output of the second detector at a fairly constant level.

In some radio receivers and in most television receivers the magnitude of the D. C. voltage available at the second detector is almost always insufficient to provide an adequate A. G. C. bias voltage for the I. F. stages. Thus, this voltage must be amplified. Some television circuits employ a separate tube as an A. G. C. keyer tube in order to obtain higher voltages. In the past, some radio receivers have been built in which a separate tube has been used as a D. C. amplifier to amplify this D. C. voltage. However, the difficulty with all of these amplifying systems is that they require an extra amplifying tube, that is, a tube having the sole function of amplifying this D. C. component and having no function in the I. F. or audio stages of the radio or television receiver. The present invention is a circuit for amplifying this D. C. voltage utilizing one of the existing tubes in the receiver so that in effect this tube serves a dual purpose: its own original and principal function and also its function as a D. C. amplifier.

Accordingly, it is an object of the present invention to provide an A. G. C. system having a minimum number of components.

It is a further object of the present invention to provide a circuit for producing an amplified A. G. C. signal utilizing existing receiver tubes.

It is another object of the invention to provide a circuit for combining tube functions in an existing tube of a receiver: one of which functions is that of D. C. amplification.

The above-mentioned objects are obtained by a circuit that conducts the D. C. component of the second detector output voltage to a grid circuit of one of the last I. F. stages, preferably the next-to-the-last I. F. stage. This fed-back D. C. component varies the anode current and gain of this I. F. stage. A D. C. load impedance is placed in the circuit of this stage so that the variances in anode current of the stage produce a varying output voltage across said this load impedance. Owing to the amplifying action of the stage, this varying output voltage is an amplified version of the input D. C. component of voltage from the second detector. This amplified signal is then conducted to the grid circuits of the early I. F. stages for providing A. G. C. action.

In some television receivers the automatic gain control signal is a composite of the output of the second detector voltage and of the D. C. component of the clipper-separator grid circuit voltage rather than the output from only the second detector as mentioned above. This composite signal can be likewise conducted to the grid circuit of one of the I. F. stages, and the amplified output obtained in the above-mentioned manner. In fact the present invention can be practiced regardless of the source of the A. G. C. signal.

Figure 2:
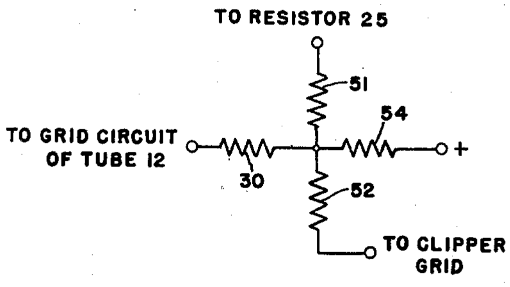

Further objects, features, and advantages will be apparent from a consideration of the following description when taken in connection with the accompanying drawings in which:

Fig. 1 is a combination block and schematic diagram of a television receiver in which the late I. F. stages, detector, and A. G. C. circuit are shown in schematic form, and Fig. 2 shows a combining resistor network that can be used in circuits in which the A. G. C. control signal is obtained from the second detector and clipper-separator grid circuit.

In Fig. 1, block 10 represents the R. F. amplifier, mixer, and the early I. F. amplifier stages, if any, of a television receiver. The output of the early I. F. stages of block 10 is conducted by means of the primary and secondary of transformer 11 to the grid of tube 12, which is the tube for the next-to-last I. F. amplifier stage. The cathode of this tube is returned to ground via a cathode self-bias resistor 14 and another resistor 15 that is the load resistor for the A. G. C. circuit, as will be subsequently shown. The resistor 15 is shunted by a capacitor 16. The output of tube 12 is conducted by transformer 17 to the input of the last I. F. amplifier stage 18. The output of the amplifier 18 is conducted in turn by a transformer 20 to the second detector 21. This detector can be of almost any type and that shown is merely representative of one of the many types of suitable detectors. As shown, this detector comprises a rectifier 23, an I. F. by-pass capacitor 24, and a series combination of resistor 25 and frequency-compensating coil 26. Of course the main function of detector 21 is to provide a detected output for the following video and sound systems and scanning circuits represented by the block labeled 28. But it is common practice to use this detector also to provide an A. G. C. output signal. This A. G. C. signal is quite often taken from the voltage across resistor 25. The voltage at the upper end of resistor 25, which is negative, is conducted by means of a filter resistor 30 to the grid circuit of tube 12, which as previously mentioned is an I. F. amplifier tube. A filter capacitor 31 connected from the low end of the grid circuit to ground serves in conjunction with resistor 30 as a low-pass filter. In most A. G. C. circuits the positive or lower end of resistor 25 is grounded. However, if the signal across resistor 25 is to be amplified, this ground connection is removed and this positive end is bypassed to ground for video frequencies by capacitor 33 and is connected, preferably by means of a filter arrangement comprising filter resistor 32 and capacitor 16, to the cathode side of resistor 15. This connection places the voltage across resistor 25, with the exception of the small drop across resistor 14, directly between the cathode and grid of tube 12. With these connections, the voltage appearing across resistor 15 is the amplified output of the D. C. component of the voltage across resistor 25. If resistor 25 had been grounded there would be a cathode follower action between the voltage appearing across resistor 15 and resistor 25; under these circumstances there would be no amplification because the output of the cathode follower is never greater than its input, or the voltage across resistor 15 could never be greater than that across resistor 25.

The application of the D. C. component of the detector output to the grid of tube 12 does not adversely affect the operation of this tube because it should have an A. G. C. voltage, and this D. C. component from detector 21 is an A. G. C. voltage. Of course this voltage has a low magnitude, but again this is also desirable. In the late I. F. stages the signal strength of the carrier signal is relatively great and hence if a large A. G. C. signal is used in these stages the extremities of the carrier signal may be shifted by the A. G. C. signal to a non-linear portion of the amplification characteristic. Of course this produces distortion. Thus, in the late stages a small A. G. C. signal is used so that there is greater protection against causing distortion.

Perhaps it is not obvious why the next-to-the-last I. F. stage is preferable for use as a D. C. amplifier rather than the last I. F. stage or one of the earlier I. F. stages. The last I. F. stage is not used because A. G. C. voltage is not applied to this stage in most circuits. This last stage is the driver for the detector circuit and thus must produce a large output. A. G. C. action always diminishes available power so if an A. G. C. voltage were applied to the last stage, this stage would not be a very effective driver for the detector. An earlier than the next-to-the-last stage can be used but this is inadvisable because in most circuits it is desirable to have a large A. G. C. signal on the earlier stages. The output voltage from detector 21 is of too low a magnitude for these early stages. A large A. G. C. signal is desired because the larger this signal the better the A. G. C. action; i. e. the more constant the output from detector 21. Of course there is no danger of distortion in the early I. F. stages resulting from the large A. G. C. signals because in these stages the carrier signal has a relatively low amplitude.

The D. C. load impedance, resistor 15, is preferably placed in the cathode circuit of tube 12 so that there is no phase inversion of the negative-going voltage from detector 21. The voltage at the non-grounded end of resistor 15 can be negative-going even though this voltage is always positive. It can be negative-going because a decrease in the positive voltage means that this voltage is becoming more negative.

The voltage across resistor 15 cannot be conducted directly to the A. G. C. bus because it is a positive voltage. The A. G. C. bus is usually connected to the grid circuits of the earlier stages so that if there was a positive A. G. C. voltage there would be grid current conduction and other undesired effects. To eliminate the positive voltage in the A. G. C. voltage before it is applied to the A. G. C. bus, a bias arrangement comprising resistors 38 and 39 and terminal 40 are provided. A negative D. C. voltage source, not shown, is connected to terminal 40. This negative voltage source must be of a constant value and in practice for television receivers, it has been found that the negative D. C. voltage that is present at the control grid of the horizontal scanning power amplifier is adequate. Lead 41, which is connected at the junction of resistors 38 and 39, is a part of the A. G. C. bus. The effect of resistors 38 and 39 and the negative voltage applied to terminal 40 is to lower the voltage on lead 41 an amount equal to the no-signal positive voltage appearing across resistor 15.

There are two principal requirements for an A. G. C. voltage, one of which is that this voltage should be substantially zero under no signal conditions. The purpose of this first requirement should be evident if it is realized that the presence of an A. G. C. voltage always lowers the gain of a tube and when there is no input signal it is desirable to have as much gain as possible so that the receiver has maximum sensitivity. The other requirement is that the A. G. C. voltage should be as large as possible. There is never too much A. G. C. voltage for the system, as previously mentioned.

Following are derivations that provide equations that determine the values for resistors 38 and 39 so that the first requirement is met, and equations that determine the value for the voltage across resistor 15 so that the second requirement is met. In these derivations $V_{15}$ represents the voltage across resistor 15, $V_{40}$ the voltage applied to terminal 40, and $R_{38}$ and $R_{39}$ represent the values of resistors 38 and 39, respectively. $V_{agc}$ is the A. G. C. voltage appearing on lead 41.

The current through resistor 38 and 39 is:

$$I_{38}=\frac{V_{15}+V_{40}}{R_{38}+R_{39}}$$

The A. G. C. voltage on lead 41 is the voltage on terminal 40 minus the voltage rise across resistor 38:

$$V_{agc}=V_{40}-\left(\frac{V_{15}+V_{40}}{R_{38}+R_{39}}\right)R_{38} \tag{1}$$

Under no signal conditions $V_{agc}=0$ so:

$$\frac{R_{38}}{R_{38}+R_{39}}=\frac{V_{40}}{V_{15}'+V_{40}} \tag{2}$$

The prime on $V_{15}$ is used to indicate the value of $V_{15}$ under no signal conditions.

From Equation 2 it is seen that resistors 38 and 39 can have many values but for any one value of resistor 38 there is only one value for resistor 39 and vice versa.

In deriving the equation for determining the value of $V_{15}'$ for maximum $V_{agc}$ it must be remembered that $V_{15}'$ is the voltage across resistor 15 under no signal conditions; i. e. it is the quiescent value. Of course this voltage can be varied merely by the change of the value of resistor 15 or of the D.-C. plate supply. Thus, $V_{15}'$ is a true variable.

From prior Equation 1 it is evident that $V_{agc}$ is maximum when $V_{15}$ becomes zero as the result of D. C. amplifier action, for then the subtracted quantity is a minimum. Thus:

$$V_{agc_{max}}=V_{40}-\left(\frac{V_{40}}{R_{38}+R_{39}}\right)R_{38} \tag{3}$$

Substituting Equation 2 in Equation 3 provides:

$$V_{agc_{max}}=V_{40}-\frac{V_{40}^2}{V_{15}'+V_{40}} \tag{4}$$

Reducing:

$$V_{agc_{max}}=\frac{V_{40}(V_{15}'+V_{40})-V_{40}^2}{V_{15}'+V_{40}} \tag{5}$$

$$=\frac{V_{40}V_{15}'}{V_{15}'+V_{40}} \tag{6}$$

In order to determine the value of $V_{15}'$ for the greatest value for $V_{agc_{max}}$, Equation 6 has to be differentiated with respect to $V_{15}'$: and the result set equal to zero:

$$\frac{dV_{agc_{max}}}{dV_{15}'}=\frac{V_{40}}{V_{15}'+V_{40}}-\frac{V_{40}V_{15}'}{(V_{15}'+V_{40})^2}=0 \tag{7}$$

Reducing:

$$\frac{V_{40}}{V_{15}'+V_{40}}=\frac{V_{40}V_{15}'}{(V_{15}'+V_{40})^2}$$

$$1=\frac{V_{15}}{V_{15}'+V_{40}}$$

$$1=\frac{1}{1+\frac{V_{40}}{V_{15}'}}$$

or $$\frac{V_{40}}{V_{15}'}=0 \tag{8}$$

From Equation 8 it is seen, then, that for maximum A. G. C. voltage the voltage across resistor 15 should be infinite. In a practical receiver this is approached by making the voltage $V_{15}'$ as large as possible. Actually, in practice some D. C. voltage must be left for the screen and plate of the tube 12, but otherwise the rest of the plate supply voltage can appear across resistor 15. For example, the voltage across resistor 15 may have a practical upper limit of say 150 volts when B+ is 250 volts. This leaves 100 volts for the screen and plate.

Referring again to the circuit elements of Fig. 1, lead 41 conducts the A. G. C. voltage across diode 42 and through filter 44 to the grid circuits of the I. F. stages for A. G. C. action. The purpose of diode 42 is to ensure that the A. G. C. voltage applied to the earlier stages is never positive. Of course if the resistors 38 and 39 are the same values in production as the calculated values, there is no danger of a positive A. G. C. voltage. But in mass production the values of resistors used in television sets vary, and thus, to be safe, a diode such as diode 42 should be placed from wire 41 to ground so that it shorts out any positive voltages that may appear. It is advisable to put a low pass filter such as filter 44 in the circuit because it prevents a form of self oscillation of a relaxation type called "motor boating" and also eliminates video and I. F. signals from the A. G. C. voltage.

If A. G. C. delay action is desired it can be obtained by using different values for resistors 38 and 39 than those calculated; the new values being such that the voltage on lead 41 is somewhat positive under no signal conditions. Then the voltage on this lead does not go negative as soon as an A. G. C. voltage appears across resistor 15 but instead there is a delay until there is a finite output from resistor 15, say from 1 to 3 volts, before the A. G. C. bus goes negative.

If a potentiometer is used in lieu of resistors 38 and 39 it can be used as an area control, i. e. for better reception of signals in fringe areas, or in local signal areas or it can be used as a contrast control.

The present invention amplifies any A. G. C. voltage regardless of its source. In Fig. 1 the A. G. C. source has been shown to be a detector but this has been shown merely as an example. The present invention can be practiced with any A. G. C. voltage regardless of the nature of the source of this voltage. Fig. 2 is presented to illustrate that the present invention is utilizable with the better designed television sets in which the A. G. C. voltage is obtained from the combination of detector and clipper-separator grid circuit rather than from the detector alone. This combination is used because the detector D. C. component is not always indicative of the carrier amplitude. For example, suppose there is a lot of black transmission and then a lot of white transmission wherein both of these transmissions take place over a fairly long period of time as compared with the time constants of the A. G. C. system. Because the output of the detector is the average of the signal from the last I. F. stage, under the present FCC standards for television transmissions during the black portion of the signal there is a large negative D. C. component in the detector output. During the white portion there is a fairly small negative D. C. component even though the peak carrier amplitude remains the same as during the black transmission. In other words, the intelligence in the carrier affects the D. C. output of the detector. This, in turn affects the A. G. C. signal although the peak carrier amplitude may remain the same. This change of A. G. C. signal with intelligence is undesired because the A. G. C. signal is supposed to change only with changes in peak carrier amplitude. The result of this change is that the gain is lowered during the black portion of the signal thereby lowering the picture contrast. But during the white portions the picture contrast is increased because the gain has been increased over that during black portions even though the peak carrier amplitude has not changed. It can be shown that the average value of the D. C. component of the clipper-separator grid circuit changes in response to changes in intelligence in just the opposite manner from the changes in the detector output stated above. That is, in the clipper-separator grid circuit, for black portions of the intelligence the negative voltage is not very large but is large for white portions. Thus, it should be apparent that if the outputs of the detector and clipper-separator grid circuit are properly combined they will exactly compensate one another to produce a substantially constant level D. C. output if the peak carrier amplitude remains constant, regardless of the intelligence on the carrier.

The resistor network shown in Fig. 2 can be used to combine the outputs of the detector and the clipper-separator grid circuits. Resistors 51 and 52 are connected, respectively, to the detector and to the clipper-separator grid. If these resistors have the proper values, the voltage at their junction has a constant level as long as there is a constant level peak carrier amplitude input to the television receiver. But this voltage varies with changes of peak carrier amplitude so that it is suitable for an A. G. C. voltage. Resistor 30 in Fig. 2 is the filter resistor corresponding to the filter resistor 30 of Fig. 1 and, thus, it is for connection into the grid circuit of tube 12. A small amount of B+ is conducted to the junction between resistors 51 and 52 through resistor 54. This current overcomes the negative D. C. component that is present arising from the detection of noise at the detector and clipper. When this negative noise voltage is balanced out the threshold sensitivity of the receiver is improved.

From the above, it can be seen that a circuit has been provided for amplifying the available A. G. C. voltage without the addition of an amplifier tube. The available A. G. C. voltage is conducted to one of the last I. F. amplifier stages—preferably the second to the last—in a manner such that this tube produces an amplified output of this voltage across a resistor in its cathode circuit. The no-signal value of this voltage is compensated to zero by the addition of a biasing arrangement. The resulting voltage is applied to the A. G. C. bus.

Although the present invention has been illustrated for use in a television set, it is equally applicable in any set in which an A. G. C. voltage can be used. The particular showings of filters, I. F. stages, detectors, etc., have no significance except that they are just one operative embodiment. There are, of course, many other suitable I. F. stages, detectors, etc., with which the present invention can be practiced.

Although I have illustrated certain specific embodiments of my invention, it will of course be understood that I do not wish to be limited thereto since various modifications can be made within the true spirit and scope of my invention and I contemplate by the appended claim to cover such modifications.

What I claim as new and desire to secure by Letters Patent of the United States is:

An automatic gain control amplifier for use in a receiver having a plurality of intermediate frequency amplifiers followed by a detector, wherein said detector has a resistor across which is developed the direct current component of the voltage output from said second detector, said amplifier comprising, means for connecting one end of the resistor of said detector to the grid of one of said intermediate frequency amplifiers, a ground bus, a biasing resistor and a load resistor serially connected in the order named between the cathode of said intermediate frequency amplifier and ground, a voltage divider having a connection thereon for providing automatic gain control voltage, a source of negative potential, means for connecting said voltage divider between the junction of said biasing resistor and said load resistor and said source of negative potential, and a unilateral conducting device connected between the connection on said voltage divider and ground, said unilateral conducting device being poled so as to conduct on the application of a positive voltage thereto.

References Cited in the file of this patent

UNITED STATES PATENTS

| | | |
|---|---|---|
| 2,085,928 | Stevens et al. | July 6, 1937 |
| 2,395,770 | Vilkomerson | Feb. 26, 1946 |
| 2,698,358 | Hoyt | Dec. 8, 1954 |